United States Patent
Kimura et al.

(10) Patent No.: US 6,170,026 B1
(45) Date of Patent: Jan. 2, 2001

(54) MOBILE COMPUTING SYSTEMS WHICH AUTOMATICALLY RECONFIGURE TO OPERATE ANY DEVICES ATTACHED TO A DOCKING MODULE UPON CONNECTION TO THE DOCKING STATION

(75) Inventors: Takayuki Dan Kimura; Kam Yuen Chan; Roger D. Chamberlain; Richard A. Livingston, all of County of St. Louis, MO (US)

(73) Assignee: Modubility LLC, St. Louis, MO (US)

( * ) Notice: Under 35 U.S.C. 154(b), the term of this patent shall be extended for 0 days.

(21) Appl. No.: 09/098,201

(22) Filed: Jun. 16, 1998

(51) Int. Cl.[7] .................................................. G06F 13/10
(52) U.S. Cl. ................................ 710/62; 710/10; 710/19; 710/63; 710/104; 709/221; 713/100
(58) Field of Search .................................... 710/102, 103, 710/8, 10, 19, 62, 63, 104; 709/221; 713/100

(56) References Cited

U.S. PATENT DOCUMENTS

| | | |
|---|---|---|
| 4,038,625 | 7/1977 | Tompkins et al. . |
| 4,345,147 | 8/1982 | Aaron et al. . |
| 4,419,616 | 12/1983 | Baskins et al. . |
| 4,527,285 | 7/1985 | Kekas et al. . |
| 4,754,397 | 6/1988 | Varaiya et al. . |
| 4,899,254 | 2/1990 | Ferchau et al. . |
| 5,124,696 | 6/1992 | Bosley . |
| 5,229,652 | 7/1993 | Hough . |
| 5,278,730 | 1/1994 | Kikinis . |
| 5,311,397 | 5/1994 | Harshberger et al. . |
| 5,325,046 | 6/1994 | Young et al. . |
| 5,331,509 | 7/1994 | Kikinis . |
| 5,384,808 | 1/1995 | Brunt . |
| 5,386,567 | 1/1995 | Lien et al. . |
| 5,434,396 | 7/1995 | Owen et al. . |
| 5,455,467 | 10/1995 | Young et al. . |
| 5,471,099 | 11/1995 | Larabell et al. . |
| 5,484,991 | 1/1996 | Sherman et al. . |
| 5,524,185 | 6/1996 | Na . |
| 5,600,800 | 2/1997 | Kikinis et al. . |
| 5,621,890 | 4/1997 | Notarianni et al. . |
| 5,630,163 | 5/1997 | Fung et al. . |
| 5,636,357 | 6/1997 | Weiner . |
| 5,694,318 | 12/1997 | Miller et al. . |
| 5,710,930 | 1/1998 | Laney et al. . |
| 5,727,221 | 3/1998 | Walsh et al. . |
| 5,734,919 | 3/1998 | Walsh et al. . |
| 5,781,798 | * 7/1998 | Beatty et al. .......................... 395/830 |
| 5,798,951 | * 8/1998 | Cho et al. .......................... 364/708.1 |
| 5,844,472 | * 12/1998 | Lee ........................................ 340/438 |
| 5,887,145 | 3/1999 | Harari et al. . |
| 5,935,259 | * 8/1999 | Anderson ................................ 714/22 |
| 5,941,965 | * 8/1999 | Moroz et al. ......................... 710/101 |
| 5,964,855 | * 10/1999 | Bass et al. ............................ 710/103 |
| 6,003,097 | * 12/1999 | Richman et al. ......................... 710/8 |
| 6,043,976 | * 3/2000 | Su ........................................ 361/686 |

\* cited by examiner

*Primary Examiner*—Thomas C. Lee
*Assistant Examiner*—Thuan Du
(74) *Attorney, Agent, or Firm*—Polster, Lieder, Woodruff & Lucchesi, L.C.

(57) ABSTRACT

A computing system includes a plurality of mobile modules, each having a multitude of possible computing states, and a plurality of docking modules, each docking module having an interface by means of which said docking module is capable of being removably connected to at least one of the powerless mobile modules. Each powerless mobile module has a central processing unit, a memory, a disk, and a docking interface, each powerless mobile module also having therein at least software for recording in that mobile module the state of that mobile module prior to that module being removed from connection to a docking module. The mobile module automatically reconfigures when connected to a docking module. It is preferred that the connection between the docking modules and the mobile modules be wireless. It is also preferred that the mobile module have no display permanently connected thereto.

18 Claims, 5 Drawing Sheets

MOBILE COMPUTING SYSTEMS WHICH AUTOMATICALLY RECONFIGURE TO OPERATE ANY DEVICES ATTACHED TO A DOCKING MODULE UPON CONNECTION TO THE DOCKING STATION

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

This invention relates to computing systems, and more particularly to mobile computing systems with improved functionality.

Various types of computers are known which allow an individual user to perform various computing functions. Typically these computers are known as personal computers. There are at least three different types: palmtop, laptop, and desktop. All three could be improved. For example, palmtop computers usually lack computational power and are often unable to execute many standard personal computer programs, laptop computers are fairly expensive and many are heavier than could be desired, and desktop computers are not portable. Furthermore, many components are not interchangeable among palmtop, laptop and desktop computers. Moreover, upgrading existing personal computers and configuring those computers is not always an easy or inexpensive task.

Many personal computers are used in networks, often local area networks (LANs). However, the variety of personal computer types available make interfacing the networks difficult or time consuming in many instances. Moreover, when portable personal computers are moved from one location to another on a network, it is typically necessary to close down all programs, remove the computer from a first location on the network, move the computer to a second location on the network, connect the computer at the second location, and restart all the desired programs. In addition, when a computer is moved to a new location on a network, it does not always have all the requisite drivers associated with the peripherals accessible from the new location.

SUMMARY OF THE INVENTION

Among the various objects and features of the present invention may be noted the provision of an improved personal computer system which is inexpensive.

A second object is the provision of an improved personal computer system which is light in weight.

A third object is the provision of an improved personal computer system which is reliable.

A fourth object is the provision of an improved personal computer system which has a relatively high degree of computational power.

A fifth object is the provision of an improved personal computer system which may be easily upgraded.

A sixth object is the provision of an improved personal computer system which provides a persistent user interface.

A seventh object is the provision of an improved personal computer system which uses standard, interchangeable components.

An eighth object is the provision of an improved personal computer system which provides a large number of configuration choices.

A ninth object is the provision of an improved personal computer system which is capable of running full versions of standard personal computer programs.

A tenth object is the provision of an improved personal computer system which preferably has only wireless connections.

An eleventh object is the provision of an improved personal computer system which facilitates the usability of portable computers at any location on a network.

A twelfth object is the provision of an improved personal computer system which includes a mobile module having no power supply.

Another object is the provision of an improved personal computer system which allows a user to have his or her own programs, data, configurations, preferences and the like available for use no matter where he or she connects to the system.

Other objects and features will be in part apparent and in part pointed out hereinafter.

BRIEF DESCRIPTION OF THE DRAWINGS

Similar reference characters indicate similar parts throughout the several views of the drawings.

DESCRIPTION OF THE PREFERRED EMBODIMENT

Figure 1:
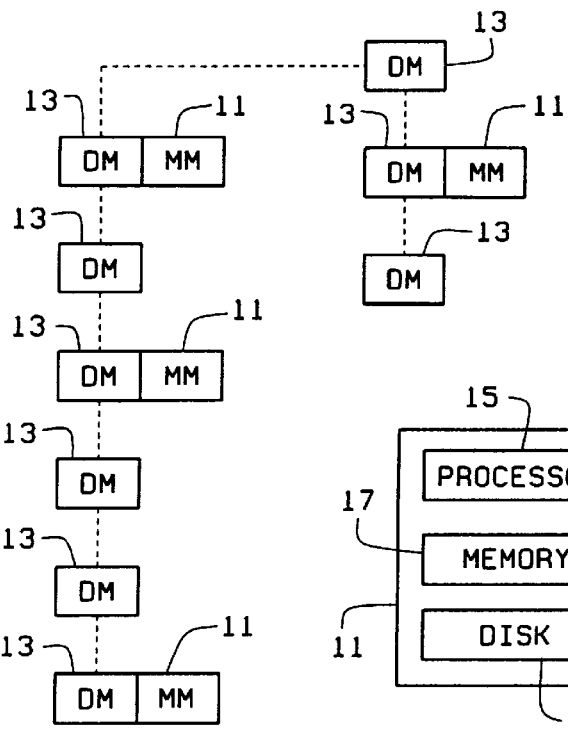
FIG. 1 is a block diagram illustrating a possible configuration of the system of the present invention.

A computing system of the present invention includes a plurality of mobile modules 11 and a plurality of docking modules 13 (FIG. 1). The docking modules may or may not be connected to each other, as indicated by the dashed lines in FIG. 1. It is preferred that the various docking modules be disposed at widely diverse locations, such as in a library, in private homes, in classrooms, in research facilities, in airports, in hotel rooms, in airplanes, in buses, and the like. Note that there is no requirement that the number of docking modules equal the number of mobile modules. In fact, it is anticipated that in many applications the number of docking modules will exceed the number of mobile modules in use at any one time.

Figure 2:
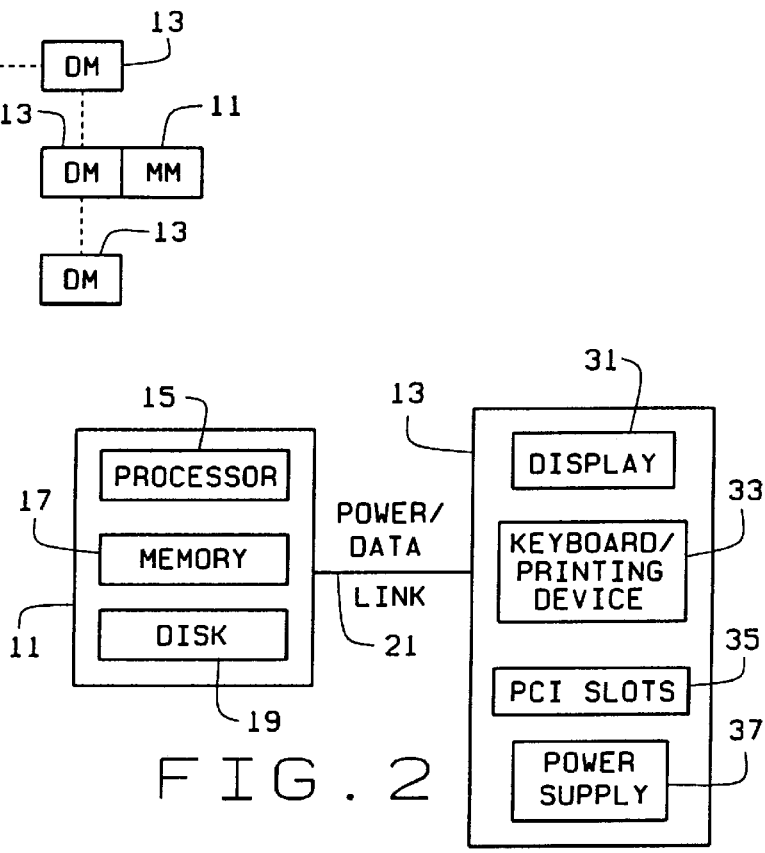
FIG. 2 is a block schematic illustrating basic parts of the present system.

Each mobile module 11 (see FIG. 2) includes a central processing unit (CPU) 15 labeled "Processor" in FIG. 2, memory 17 (including enough random access memory to run full versions of standard PC application software), a disk 19, and a portion of an interface 21 for transmitting power from a docking module 13 and for transmitting data between the mobile module and the docking module. All these components except the interface are standard components, and it is preferred that such standard components be used as much as possible to promote component competition and to improve upgradability and reusability of the modules. It is preferred that the mobile modules not have displays connected thereto, since these add undesired weight and expense. The display function, as indicated below, is provided by the various docking modules. Thus, the mobile modules themselves are preferably "displayless."

Although the interface is shown as a single line in FIG. 2, the interface actually includes components located both on the mobile module and on the docking module, all as described below. As will become apparent, each mobile module 11 records its computing state as it is removed from a docking module. This state is recorded on the disk 19 to expedite use of the mobile module when it is reconnected to a docking module.

The mobile modules do not have power supplies of their own. This reduces both the size and the weight of the mobile modules. Power is transferred, as described below, from the docking modules to the mobile modules. Thus, the mobile module may be thought of, in the preferred embodiment, as being "powerless", in the sense that it obtains operational power from the docking station. This should not preclude the addition of a small battery in a mobile module for powering a clock or providing temporary power during shut-down. What is not meant by the use of the word "powerless" is a mobile module which has sufficient internal power to sustain full-power operation of the module for a commercial significant period of time, i.e., for more than a few minutes.

Figure 2A:
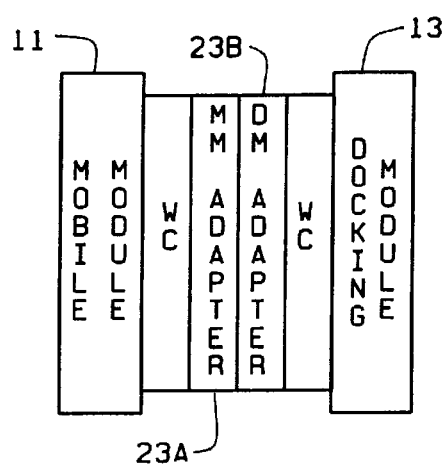
FIG. 2A is a block diagrammatic view of a hard-wired system of the present invention which is convertible to a wireless connection.

It is preferred that the removable connection between the mobile module 11 and the docking module 13 be wireless, as described below. Nevertheless, it is contemplated that a wired connection could also be used. In that event, it is preferred that the "wired" system be upgradable if desired to a wireless system by means of adapters 23A and 23B (FIG. 2A) which convert the wired connections "WC" of a wired system to the wireless connections as described below. With the preferred wireless connection, the mobile module 11 is preferably physically packaged with no electronic connector and is completely enclosed.

Each docking module 13 may contain or have connections for various peripheral devices and interface units, examples of which are shown in FIG. 2 as a display 31, a keyboard and/or a point device 33, and PCI slots 35, connected in a conventional manner through a bus. Each docking module 13 may have a power supply 37 of its own, or may receive power through an interface unit. It is preferred that each docking module 13 have a docking module descriptor which is transmitted to the mobile module 11 upon docking for dynamic reconfiguration as described below. It is also preferred that more than one docking module 13 can be cascaded into a single docking module.

Examples of mobile modules and docking modules are as follows:

1. A mobile module may have

| CPU | Pentium 166 MHz with MMX |
|---|---|
| RAM | 32 MB |
| Hard Drive | 2 GB (2.5") |
| OS | Windows 95 |
| Interface | RF bridge |

This mobile module is easily packaged into an enclosure of 6"×4"×1", weighing ½ pound.

2. A second mobile module may have

| CPU | Pentium 266 MHz with MMX |
|---|---|
| RAM | 64 MB |
| Hard Drive | 5 GB (2.5") |
| OS | Windows NT |
| Interface | Optical bridge |

Figure 3:
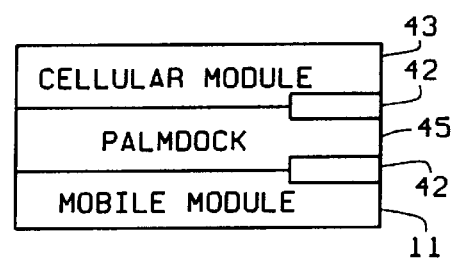
FIGS. 3 to 5 are block diagrams illustrating possible variations of docking modules used with a mobile module of the present invention.

3. A first docking module 41, labeled "Palmdock," is shown in FIG. 3 connected to mobile module 11. Such a docking module could include, by way of example, an LCD display (6" color) with digitizer, a stylus pen, sound/voice capability, a battery, and two RF bridge interfaces 42 (represented by the dark blocks in FIG. 3). This docking module could optionally include a cellular module 43 having a cellular wireless modem.

Figure 4:
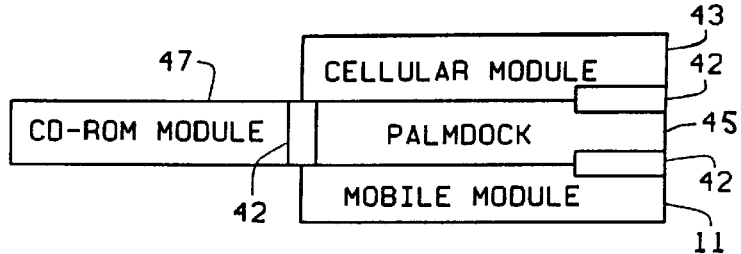

4. A second docking module 45, labeled "Lapdock," is shown in FIG. 4 connected to a mobile module 11. Docking module 45 could include, for example, a 12" TFT color LCD display, a portable keyboard and pointing device, sound and voice capability, a PCMCIA port, a battery, and the three interfaces 42 shown. Docking module 45 is shown connected to an optional cellular module 43 and an optional CDROM module 47. The CDROM module, for example, has a CDROM drive and a battery.

Figure 5:
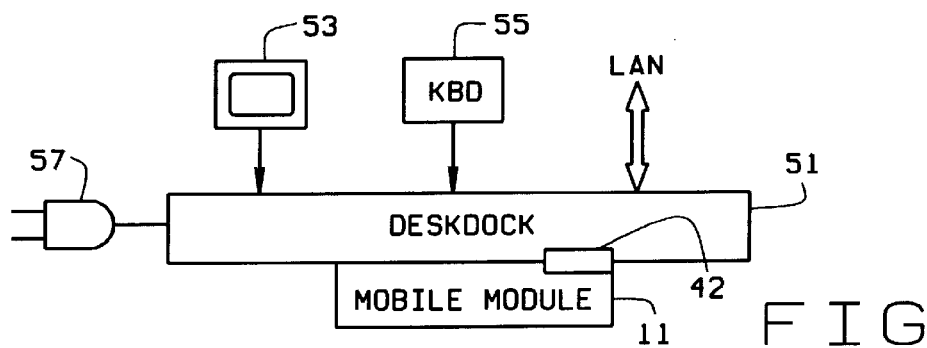

5. A third docking module 51, labeled "Deskdock" in FIG. 5, is connected by an interface 42 to a mobile module 11. Docking module 51 could include a video monitor port for a video monitor 53, a network adapter for a network such as the LAN indicated in FIG. 5, a parallel port, serial ports, a keyboard port for a keyboard 55, sound and voice capability, and an AC power adapter 57.

It should be understood that all the modules described above are illustrative only.

As described above, it is preferred that the connection between each mobile module 11 and each docking module 13 be wireless. For example, in FIGS. 6 and 6A there is shown an electrical schematic and a simplified physical representation of one channel of an optical wireless data connection. It should be understood that these figures show data flow in one direction only (e.g., mobile module to docking module). Similar circuitry is provided for data flow in the opposite direction. The number of channels provided is a matter of designer choice.

Figure 6:
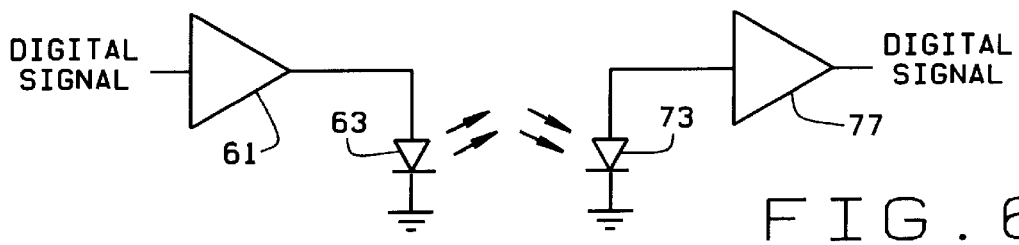
FIGS. 6 and 6A are schematic diagrams of the electrical and physical implementations of one possible form of wireless data connection between the docking modules and mobile modules of the present invention.
Figure 6A:
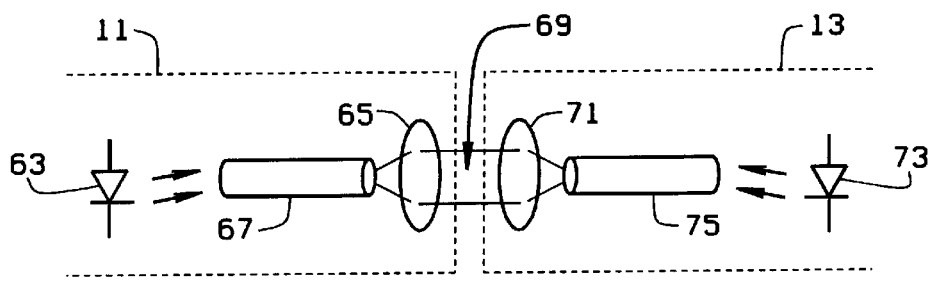

In the circuitry of FIGS. 6 and 6A, a digital signal is supplied through a driver 61 to a laser diode or light-emitting diode (LED) 63. The corresponding optical output of the diode 63 is supplied either directly to a collimating lens 65 (FIG. 6A) or optionally through an optical fiber 67 to lense 65. Lense 65 is on one side of an gap 69 between the mobile module and the docking module. On the other side of the gap is a second lense 71 which supplies the optical output either directly to a photodiode 73 or indirectly to the photodiode through an optical fiber 75. As shown in FIG. 6, the output of photodiode 73 is provided to the input of a transimpedance amplifier 77, whose output is the corresponding digital signal.

Figure 7:
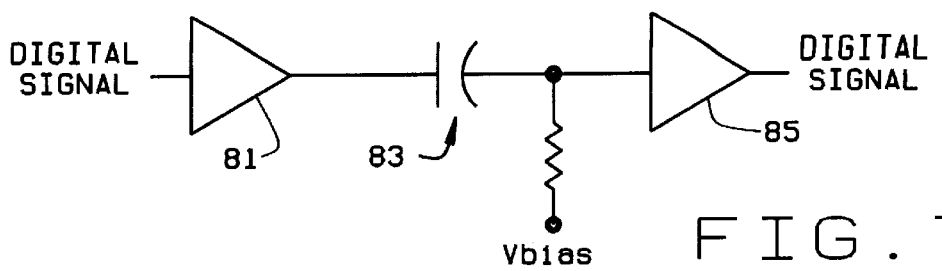
FIGS. 7 and 7A are schematic diagrams similar to FIGS. 6 and 6A showing an alternative implementation.
Figure 7A:
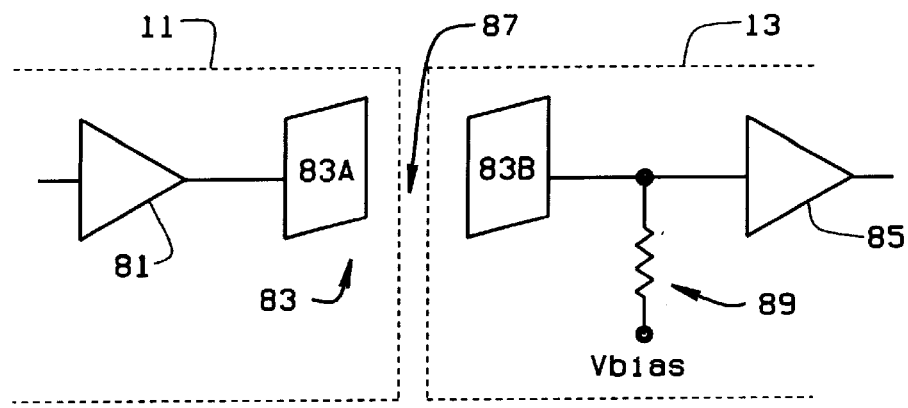

Alternatively, in the circuitry of FIGS. 7 and 7A, the digital signal is capacitatively coupled between the mobile module and the docking module. More specifically, in those figures the digital signal is supplied via a buffer 81 through a capacitor 83 to a buffer 85 in the docking module. As shown more clearly in FIG. 7A, capacitor 83 consists of a first plate 83A in the mobile module and a second plate 83B in the docking module, which plates are separated by an gap 87. Buffer 85 also has a conventional bias circuit 89 connected to its input. The output of buffer 85 is the corresponding digital signal.

In both the embodiments of FIGS. 6 and 7, it is important to maintain the proper spatial relationship between the mobile module and the docking module. That relationship can be maintained, for example, by corresponding mating structures on the various modules so that the interfaces line up properly and have the proper spacing.

Figure 8:
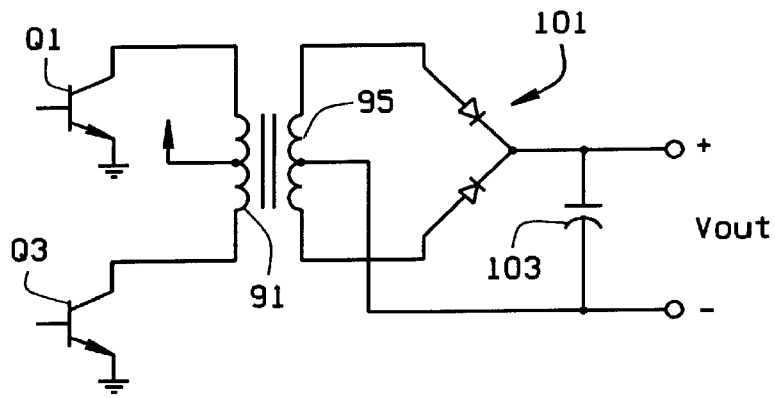
FIGS. 8 and 8A are schematic diagrams of the electrical and physical implementations of a wireless power transmission connection between the docking modules and mobile modules of the present invention.
Figure 8A:
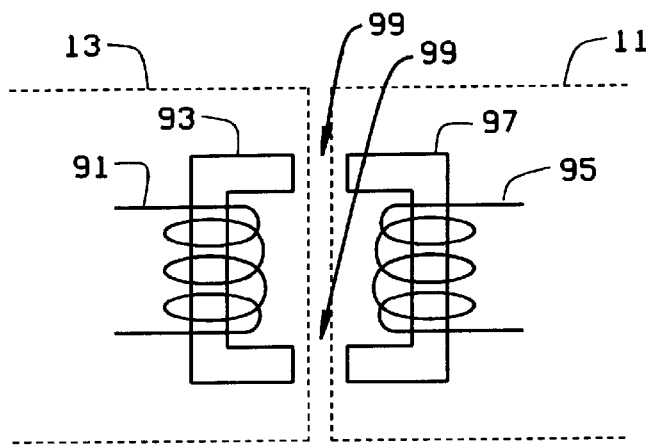

Turning to FIGS. 8 and 8A, the preferred embodiment of wireless power transmission from the docking module to the mobile module is shown. A pair of drive transistors Q1 and Q3 are connected to opposite sides of a center-tapped transformer primary winding 91 wound around a core 93. The secondary winding 95 of the transformer is wound about a core 97 disposed in mobile module 11. When the mobile module is docked in the docking module, the pole faces of the cores associated with the primary and secondary windings are disposed as shown in FIG. 7A across a gap 99, created by the cases of the mobile module and the docking module and any space associated therewith. The output of secondary winding 95 is supplied via a diode bridge 101 and a filter capacitor 103 to provide the output voltage VOUT to power the mobile module.

As mentioned above, when a mobile module is removed from a docking module 13, the computational state of the mobile module is recorded on the hard disk of the mobile module. Although it is contemplated that this may be done automatically, it is also within the scope of the present invention that such recording be done manually (i.e., in response to a manual signal from the user that the mobile module is about to be disconnected). When that mobile module is reconnected to the same or another docking module, the mobile module on power-up reads the stored computational state and resumes computation at that point without the necessity of user intervention.

Figure 9:
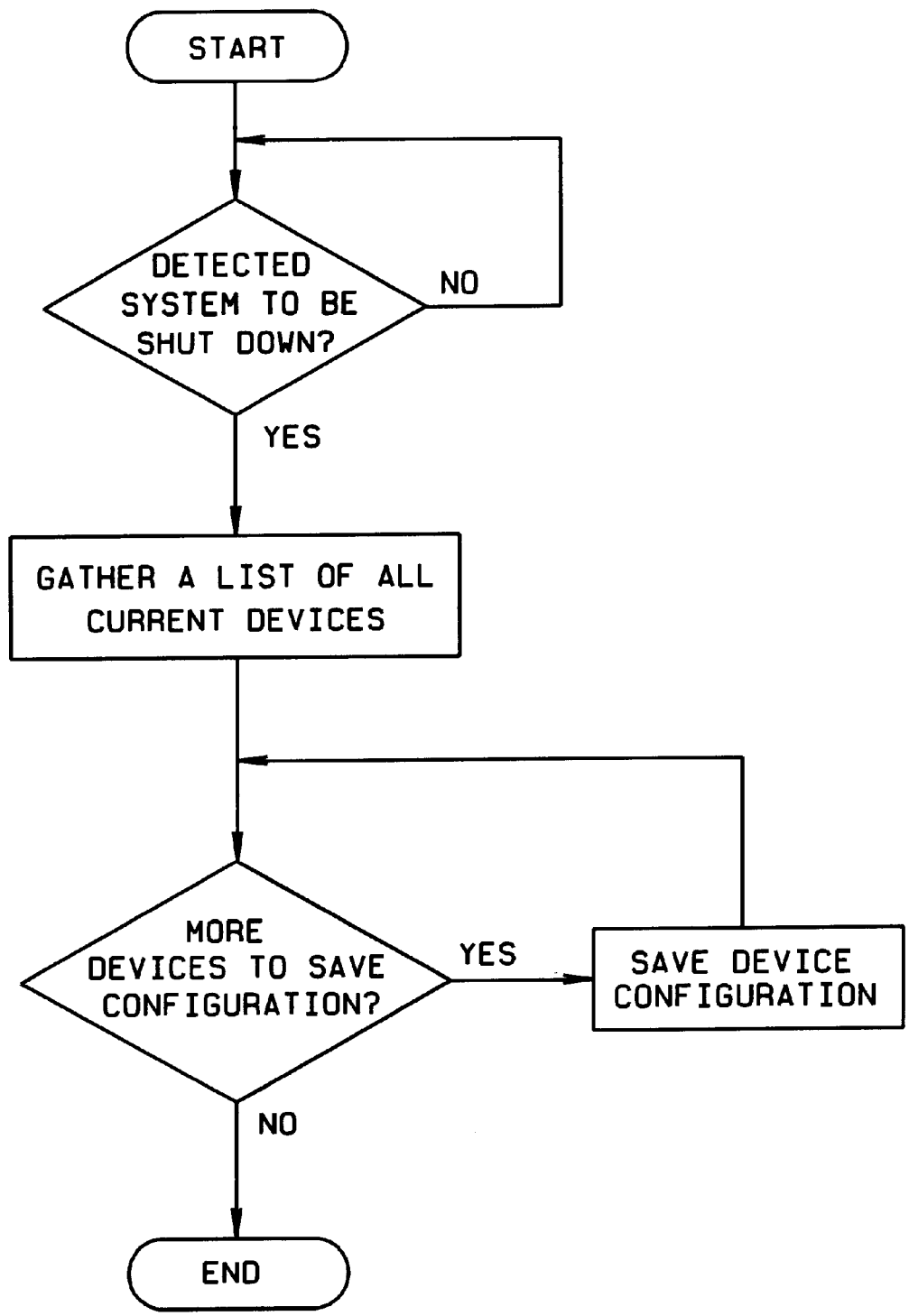
FIGS. 9 and 9A are flow charts illustrating the dynamic reconfiguration feature of the present invention.
Figure 9A:
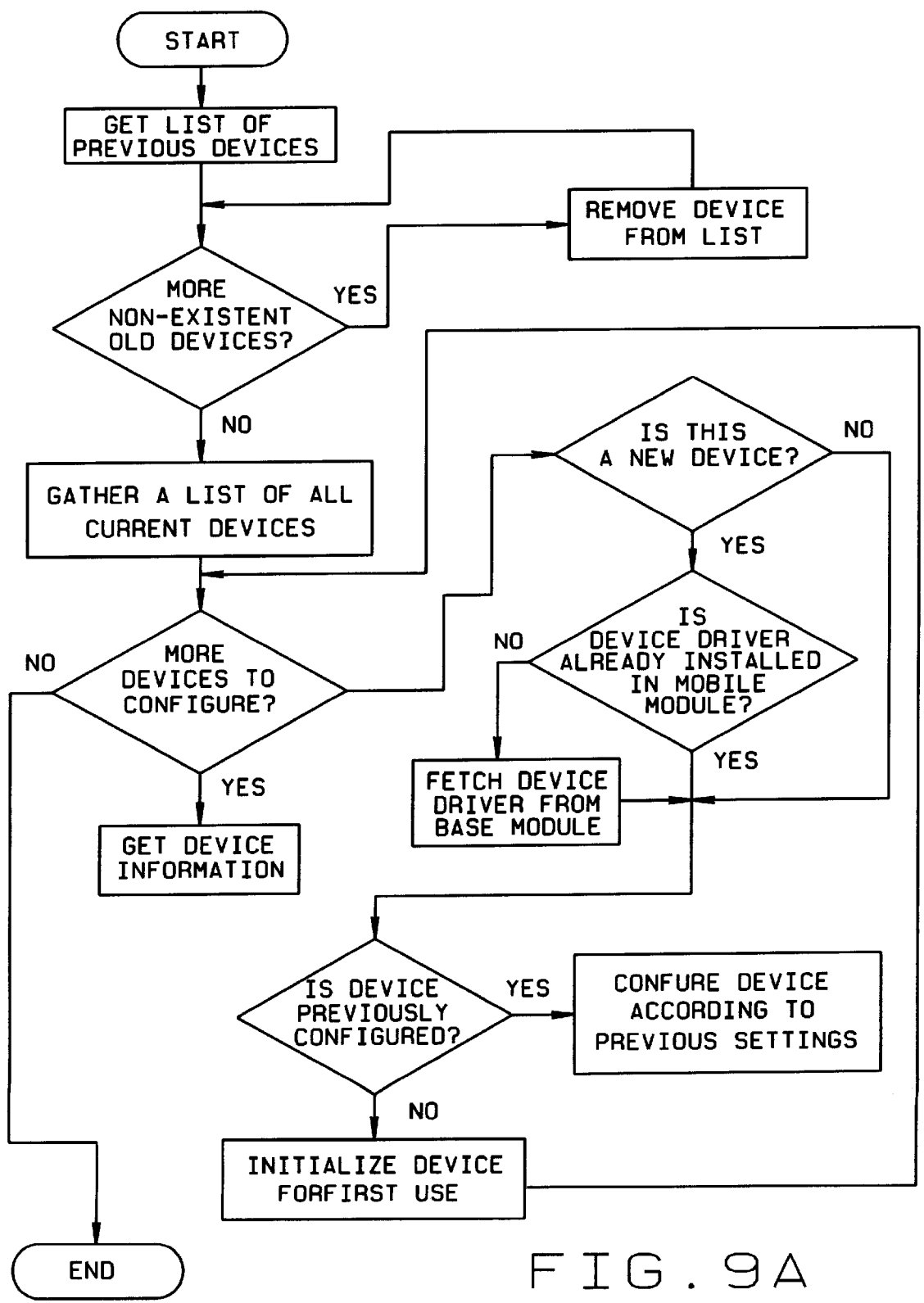

The mobile module also performs another operation upon removal and connection to a docking module, which is illustrated in FIGS. 9 and 9A. Specifically, each mobile module 11 is programmed to configure itself to work with the devices associated with the particular docking module 13 to which it is connected. Upon detecting the fact that the mobile module is to be shut down (see FIG. 9), the CPU of the mobile module gathers a list of all current devices associated with that docking module. It saves the device configuration for each device found until there are no more device configurations to save. At that point it exits the configuration routine illustrated in FIG. 9.

Upon reconnection to a docking module 13 (FIG. 9A), the mobile module CPU retrieves the list of previous devices and compares them to the list of devices associated with the present docking module. (The present docking module communicates the list of present devices to the mobile module either by means of a docking module descriptor, or by identifying each device specifically to the mobile module.) The CPU removes devices from the pre-existing list if they are not associated with the present docking module and continues this process until all missing devices are removed. It then retrieves the list of devices associated with the current docking module and organizes configuration information for those devices. Specifically, for each device to configure, the mobile module CPU first determines if this is a new device. If so, it checks to see if the device driver for that device is already installed in the mobile module. If it is not, the mobile module CPU fetches the device driver from the docking module (also called the base module).

If the device is not a new device, or if the device driver is already installed in the mobile module, the CPU then checks to see if the device has been previously configured. If it has, then the device is reconfigured according to the previous settings. If it has not, the device is initialized for its first use by this mobile module.

This process of dynamic configuration is repeated until all devices have been configured, at which point the CPU exits the dynamic reconfiguration routine of FIG. 9A. Each mobile module 11, once reconfiguration is complete, treats the docking module devices as native devices. No adapters or other interfaces are required for each mobile module 11 to use all the devices connected to any particular docking module 13.

It is preferred that upon dynamic configuration of the mobile module, the interface displayed to the user be "persistent." That is, using a graphical user interface example, no matter what docking module a user connects his or her mobile module to, the graphical user interface (the icons and their arrangement, for example) and the previously set user preferences, will remain unchanged. This provides a level of comfort to the user and permits the user to immediately start computing without having to navigate a new interface.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A computing system comprising:

a plurality of powerless mobile modules, each having a multitude of possible computing states;

a plurality of docking modules, each docking module having an interface by means of which said docking module is capable of being removably connected to at least one of the powerless mobile modules, each docking module signaling to a mobile module upon connection the identity and description of any devices attached to that docking module;

each powerless mobile module having a central processing unit, a memory, a disk, and a docking interface, each powerless mobile module also having stored therein at least software for recording in said mobile module the state of said mobile module prior to said module being removed from connection to a docking module, each mobile module being responsive to connection in a docking module to configure to operate any devices attached to the docking module.

2. The computing system as set forth in claim 1 wherein at least one mobile module has an application program stored therein, the computing state of said mobile module including the state of the application program when the application program is being executed.

3. The computing system as set forth in claim 1 wherein each mobile module is wirelessly connectable to each docking module.

4. The computing system as set forth in claim 1 wherein each docking module includes circuitry for supplying power to any mobile module connected thereto.

5. The computing system as set forth in claim 1 wherein each docking module includes a descriptor which is communicated to each mobile module connected thereto, said mobile module being responsive to said descriptor to reconfigure said mobile module.

6. The computing system as set forth in claim 1 wherein each mobile module is responsive to the recorded state thereof and to subsequent connection to a docking module to resume computation at the recorded state without user intervention.

7. The computing system as set forth in claim 1 wherein the connection includes capacitative coupling.

8. The computing system as set forth in claim 1 wherein the connection includes optical coupling.

9. The computing system as set forth in claim 1 wherein the connection includes transformer power coupling.

10. The computing system as set forth in claim 1 wherein each mobile module is responsive to signals representing the identity of devices attached to a docking module upon connection to load the device drivers for said devices.

11. The computing system as set forth in claim 10 wherein some device drivers are stored in the mobile module.

12. The computing system as set forth in claim 10 wherein device drivers for devices attached to a particular docking module which have not previously been stored in a mobile module are copied into the mobile module upon connection to said docking module.

13. The computing system as set forth in claim 1 wherein at least one docking module includes a plurality of pin connections for connection to corresponding pin connections on at least one mobile module, further including interface circuitry disposed between the pin connections of the docking module and the pin connections of the mobile module to make a wireless connection between said docking module and said mobile module.

14. A computing system comprising;
a plurality of powerless mobile modules, each having a multitude of possible computing states;
a plurality of docking modules, each docking module having an interface by means of which said docking module is capable of being removably connected to at least one of the powerless mobile modules, each docking module signaling to a mobile module upon connection the identity and description of any devices attached to that docking module;
each powerless mobile module have a central processing unit, a memory, a disk, and a docking interface, said powerless mobile module also having stored therein at least software for recording in said mobile module the state of said mobile module prior to said mobile module being removed from connection to a docking module, each mobile module further being responsive to signals from said docking module to configure to operate with any devices attached to the docking module;
each of said docking module interfaces and said mobile module docking interfaces being wireless, so that power and data are transferred between the docking modules and the powerless mobile modules without a wire connection therebetween.

15. The computing system as set forth in claim 14 wherein at least some of the mobile modules are completely enclosed.

16. A computing systems comprising:
a plurality of displayless mobile modules, each having a multitude of possible computing states;
a plurality of docking modules, each docking module having an interface by means of which said docking module is capable of being removably interconnected to at least one of the displayless mobile modules, each docking module configured to signal to a mobile module upon connection the identity and description of any devices attached to that docking module;
each displayless mobile module having a central processing unit, a memory, a disk, and a docking interface, said displayless mobile module also having stored therein at least software for recording in said mobile module the state of said mobile module prior to said module being removed from connection to a docking module, each mobile module being responsive upon connection to a docking module to configure to operate with any devices attached to the docking module.

17. The computing system as set forth in claim 16 wherein each docking module includes a display for displaying information from any mobile module connected thereto.

18. A method of configuring mobile computing modules capable of use with a plurality of docking modules, comprising the steps of:
storing device drivers in a mobile module, said device drivers being those drivers required by the mobile module at a first docking module;
upon connection of said mobile module to another docking module, automatically identifying to the mobile module the device drivers required by said another docking module;
automatically loading into said mobile module upon connection any device drivers required at said another docking module which were not required at said first docking module;
providing a memory, a disk, and a docking interface for each mobile module, and storing in said mobile module at least software for recording in said mobile module the state of said mobile module prior to said mobile module being removed from connection with said first docking module; and
identifying to said mobile module upon connection with the another docking module the identity and description of any devices attached to that docking module, said mobile module being responsive to connection to configure to operate with any devices attached to the another docking module.

* * * * *